United States Patent [19]
Zenner et al.

[11] Patent Number: 5,212,938
[45] Date of Patent: May 25, 1993

[54] MULCHING MOWER WITH OBROUND CUTTING CHAMBER

[75] Inventors: Michael N. Zenner, Lakeville; Richard J. Guertin, Mounds View, both of Minn.

[73] Assignee: The Toro Company, Minneapolis, Minn.

[21] Appl. No.: 800,324

[22] Filed: Nov. 27, 1991

[51] Int. Cl.$^5$ .................. A01D 34/72; A01D 34/73
[52] U.S. Cl. ............................ 56/320.1; 56/17.5; 56/255
[58] Field of Search ............... 56/12.7, 17.4, 17.5, 56/255, 320.1, 320.2, 13.4, 13.8

[56] References Cited

U.S. PATENT DOCUMENTS

| | | | |
|---|---|---|---|
| 3,085,386 | 4/1963 | Slemmons | 56/13.4 |
| 4,189,903 | 2/1980 | Jackson et al. | 56/255 |
| 4,205,512 | 6/1980 | Thorud | 56/13.4 |
| 4,226,074 | 10/1980 | Mullet | 56/320.2 |
| 4,951,449 | 8/1990 | Thorud | 56/2 |
| 5,133,176 | 7/1992 | Baumann et al. | 56/320.1 X |

FOREIGN PATENT DOCUMENTS 607916 11/1960 Canada .......................... 56/13.8
2100988 7/1972 Fed. Rep. of Germany ........ 56/255

OTHER PUBLICATIONS

Drawing illustrating Toro 21" Grassmaster Deck.
Drawing illustrating Toro 21" VDM Recycler Deck.
Drawing illustrating Toro 18" VDM Recycler Deck.

Primary Examiner—David J. Bagnell
Attorney, Agent, or Firm—James W. Miller

[57] ABSTRACT

A mulching mower has at least one generally enclosed cutting chamber in which a rotatable cutting blade is carried for rotation in a generally horizontal cutting plane. The side wall which defines the circumferential boundary of the cutting chamber is not perfectly circular with respect to the axis of blade rotation. Instead, the chamber is stretched or elongated with respect to the blade tips over the rear half of the chamber to be obround to the rear of the chamber. This enhances use of the mower as a mulcher. In addition, grass deflecting members are desirably used in the rear half of the chamber to further enhance the mulching action provided by the chamber.

19 Claims, 2 Drawing Sheets 5,212,938

MULCHING MOWER WITH OBROUND CUTTING CHAMBER

TECHNICAL FIELD

This invention relates to a rotary mower for cutting grass and other ground growing vegetation and for depositing or hiding the grass clippings resulting from the cutting action in the cut grass path.

BACKGROUND OF THE INVENTION

"Mulching" mowers are known which deposit or hide the grass clippings in the cut grass path as opposed to simply discharging such clippings on top of the grass or collecting the clippings in some type of bagging apparatus. Such mowers vary widely in their ability to actually hide the clippings with some mowers doing a better job than other mowers. However, the term "mulching" when used to describe a mower generally refers to a mower which is intended to deposit the clippings in the cut grass path, regardless of the degree of effectiveness such a mower might have.

So called "dedicated" mulchers are mowers designed only for this purpose as shown in U.S. Pat. No. 4,205,512 to Thorud. They generally have included a cutting chamber which is enclosed over the sides and top thereof and which is open only at the bottom. This allows the grass clippings cut by the blade to be deposited downwardly through the open bottom of the cutting chamber. In some cases, a specially shaped blade assists in the downward movement of the grass clippings, or grass deflector members may be carried inside the cutting chamber.

Interest has recently grown in the use of mulching mowers particularly with the advent of restrictions by municipalities on the disposal of yard waste in landfills. To that end, The Toro Company, the assignee of the present invention, has designed and introduced a line of walk-behind mowers, known as Recycler ® mowers. The Recycler ® mowers are selectively convertible by the user between grass discharging, grass bagging, and grass mulching modes. In addition, these mowers include a plurality of grass deflecting members, also known as kicker members, which intercept the grass clippings circulating inside the housing to assist in their downward discharge from the cutting chamber when the mower is being used as a mulcher. U.S. Pat. No. 4,951,449 to Thorud illustrates a Recycler ® mower.

Most rotary mowers, including those used for mulching, usually have cutting chambers which are circular, i.e. a chamber in which the cutting blade is centered within the chamber and the tip of the cutting blade maintains a constant nominal clearance to the wall of the cutting chamber at least within the manufacturing tolerances that are applicable. However, certain mowers have been designed with slightly non-circular or "obround" cutting chambers. The word "obround" is meant to refer herein to a cutting chamber which is not perfectly circular with respect to the blade tip. While an oval or elliptical chamber would also be an obround chamber, the word obround is meant to cover more than an oval or elliptical chamber. Thus, an "obround" chamber will mean any chamber in which the chamber has been stretched or elongated somehow with respect to a centered blade, or in which the blade has been offset relative to the center of a circular chamber, so that at least a portion of the chamber wall is farther away from the blade tip than the remaining portion of the chamber.

In the obround mowers known to Applicants, the obround portion was located in the front of the cutting chamber taken with reference to the direction of advance or forward motion of the mower, i.e. in that portion of the cutting chamber which first contacts the grass as the mower is moved forwardly. It was thought that this extra clearance between the blade and the front chamber wall would allow the uncut grass stems to be better lifted and elevated by the sail configuration on the blade before being cut. In other words, it was thought that the grass would be stood up better and thus be more uniformly cut with an obround portion in the front of the cutting chamber. The Toro Company has previously used such an obround portion in the front of the cutting chamber in certain of its products such as the Toro Grassmaster, Toro VDM Rear Bagger and Toro 21" Recycler ®.

SUMMARY OF THE INVENTION

One aspect of the present invention relates to a mulching mower having a cutting chamber provided with an obround shape to function more effectively in mulching grass without leaving undesirable deposits of grass on the ground, especially when the mower backs up or reverses direction.

A mower according to the present invention has at least one generally enclosed cutting chamber in which a generally horizontal cutting blade is contained. The cutting blade is rotatable about a vertical axis to sever grass or the like. The cutting chamber includes a peripheral side wall which substantially surrounds the blade and is relatively unbroken at the level of the grass clippings being circulated by rotation of the blade such that the grass clippings are contained within the cutting chamber until such time as they are driven downwardly out of the cutting chamber through an open bottom side of the cutting chamber. One aspect of the present invention relates to the shape of the cutting chamber and comprises a cutting chamber which is obround over the rear portion thereof.

Another aspect of the present invention includes the use of deflecting members in the rear portion of the cutting chamber to assist in deflecting the grass clippings downwardly out of the cutting chamber. In one embodiment, two spaced deflecting members are used and they are located only in the rear portion, and not in the front portion, of the cutting chamber.

BRIEF DESCRIPTION OF THE DRAWINGS

The present invention will be described hereafter in the Detailed Description, taken in conjunction with the following drawings, in which like reference numerals refer to like elements or parts throughout.

FIG. 3 is a perspective view of one of the cutting chambers of the cutting deck shown in FIG. 1, particularly illustrating the grass deflecting members placed in

DETAILED DESCRIPTION

Figure 1:
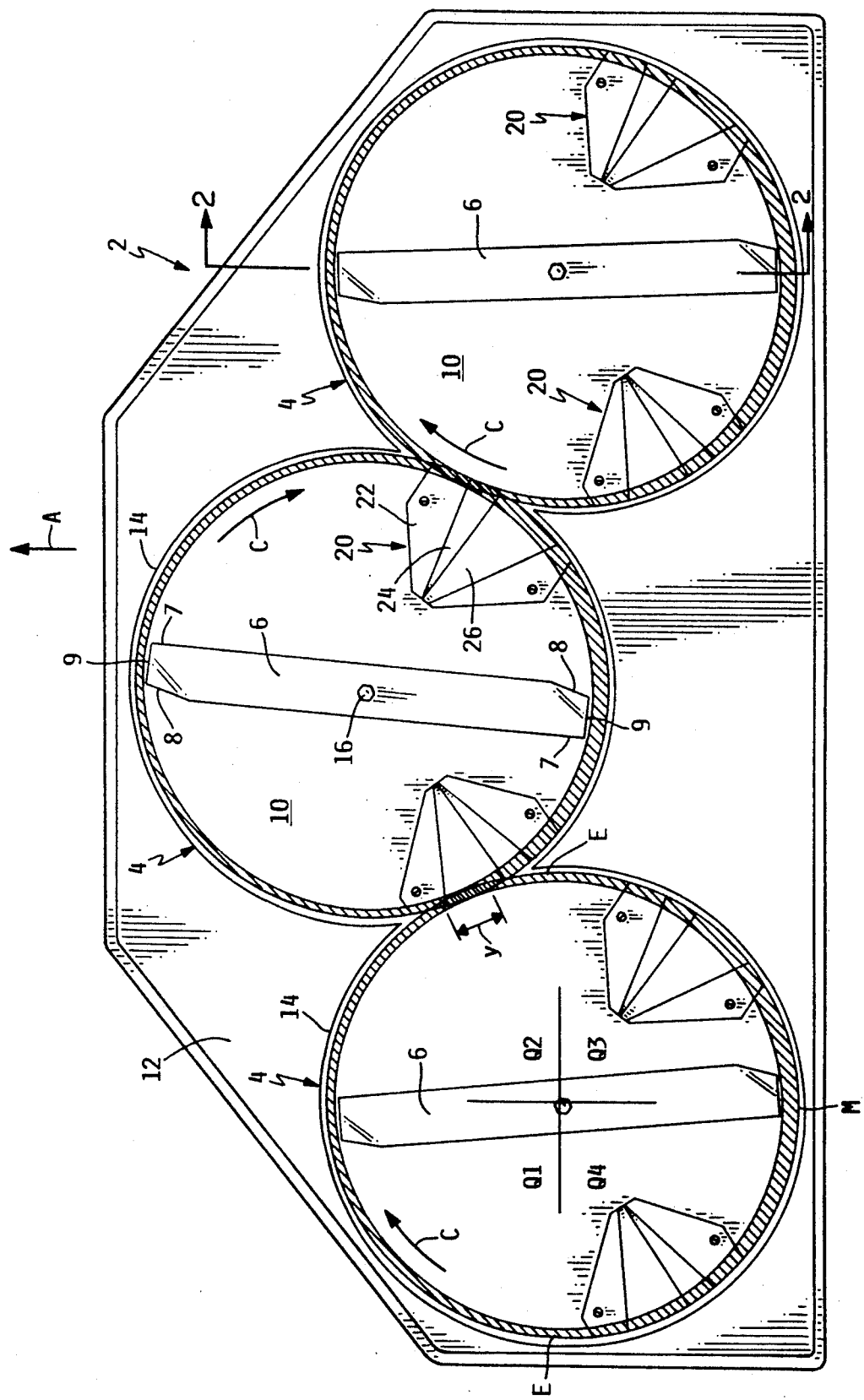
FIG. 1 is a bottom plan view of one embodiment of an improved mower according to the present invention, particularly illustrating a deck having multiple cutting blades and multiple cutting chambers, and further illustrating the obround configuration of the cutting chamber.

FIG. 1 illustrates a mower according to the present invention which includes a cutting deck generally referred to as 2. Cutting deck 2 is supported for movement over the ground in any suitable manner known in the art. For example, deck 2 could be a self contained deck directly supported on the ground by various wheels (not shown) or, alternatively, could be an attachment to a traction unit (not shown) which suspends and carries deck 2 above the ground. In any event, cutting deck 2 shown herein has three side-by-side cutting chambers 4 that are staggered fore and aft relative to one another in the manner often used for multiple bladed mowers.

While the mower of the present invention illustrates three side-by-side cutting chambers 4, greater or fewer numbers of chambers 4 could be used. For example, only a single cutting chamber 4 need be provided for the purposes of this invention. The present invention, which relates to a desirable shape for cutting chamber 4 when the mower is used for mulching, would apply equally well to a mower with one cutting chamber 4 as opposed to the mower shown in FIG. 1 having three chambers 4. Thus, the precise number of cutting chambers 4 employed in cutting deck 2 is irrelevant to the present invention.

A generally horizontal cutting blade 6 is contained within each cutting chamber 4. Blade 6 has cutting edges 7 on opposed ends thereof. Each cutting edge 7 is followed by a grass elevating sail 8. In addition, each blade 6 has a pre-determined diameter defined by the length of the blade between the opposed tips 9 thereof.

As blades 6 are rotated within chambers 4, the blades have their cutting edges 7 brought into contact with standing stalks of grass to sever the grass at a particular height above the ground determined by the height of cutting deck 2 above the ground. The blade sails 8 then cause the grass to be circulated within the cutting chambers in a generally circumferential path identified by the arrows C though the blades could rotate in the opposite direction if desired, i.e. blades 6 could rotate clockwise or counterclockwise in a mower of this general type. Blades 6 can have any appropriate configuration of cutting edges 7 and sails 8 which would allow the grass cutting and circulating actions just described to take place.

Looking at any one of the cutting chambers shown in FIG. 1, each cutting chamber is bounded by a top wall portion 10 which is often simply a part of a larger upper wall 12 of cutting deck 2. In other words, the upper wall 12 of deck 2 is not necessarily coextensive with the area of chambers 4, but extends outwardly beyond the cutting chambers 4 in the manner shown in FIG. 1. The exact shape of the upper wall 12 of deck 2, and thus the overall shape of deck 2, can obviously vary from that shown in FIG. 1. However, the upper wall 12 of deck 2 provides the top wall portion 10 which encloses the top of each cutting chamber 4. The driving spindle 16 for blade 6 passes vertically down through such top wall portion 10 along the vertical axis of rotation of blade 6, but otherwise top wall portion 10 is usually substantially sold to confine the grass clippings within cutting chamber 4.

Figure 3:
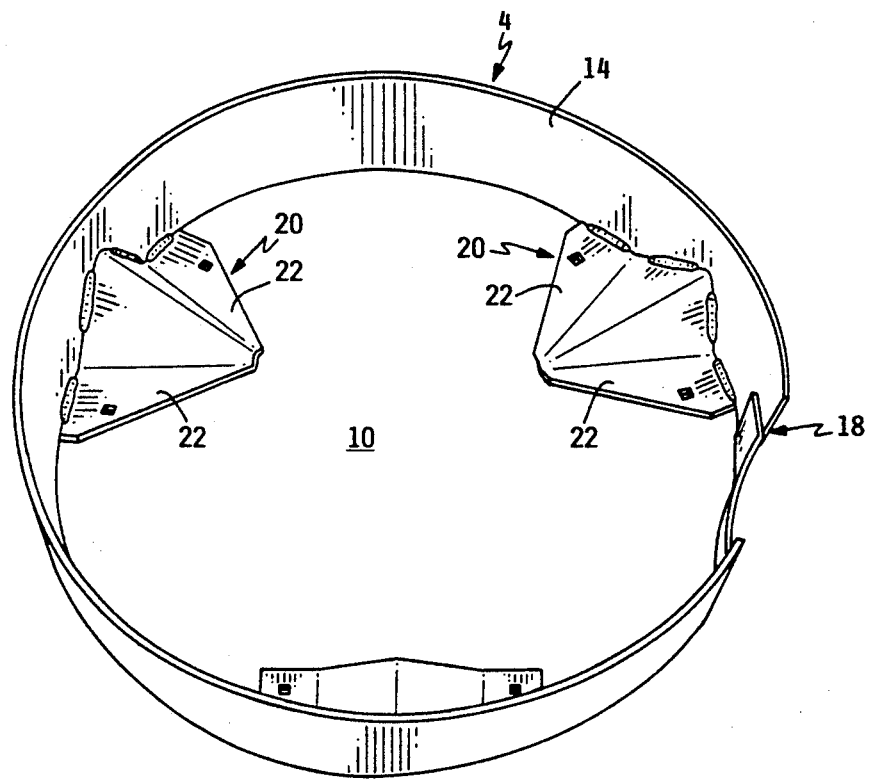

In addition to the top wall portion 10, each cutting chamber 4 includes a peripheral downwardly extending side wall or skirt 14 that extends approximately 360° to enclose the orbit or rotational path of blade tips 9. The cross-hatched area in FIG. 1 is not meant to represent the thickness or cross-sectional area of this peripheral wall 14 as the walls 14 of chambers 4 are themselves shown in FIG. 1 radially outside of the cross-hatched area. Rather, the cross-hatched area in FIG. 1 illustrates the clearance between the tips 9 of blade 6 and the inside diameter of wall 14. At the intersection between adjacent chambers in the areas denoted as y, peripheral chamber walls 14 are windowed or apertured at their lower edges (as shown at 18 in FIG. 3) to allow the tips of blades 6 in adjacent chambers 4 to come quite close together without contacting one another.

Each chamber 4 is generally identical in shape. Accordingly, only one chamber 4 will be described in detail. It is understood that this description will apply equally well, however, to the other chambers 4.

Referring to FIG. 1, each chamber 4 can be selectively divided into four quadrants identified as Q1–Q4 beginning with a front left quadrant Q1, a front right quadrant Q2, a rear right quadrant Q3 and a rear left quadrant Q4, respectively, when viewed looking up from beneath cutting chamber 4 in the manner depicted in FIG. 1. Most of the actual grass cutting is done in quadrants Q1 and Q2 while the grass transport occurs primarily in quadrants Q3 and Q4, at least for a mower that evacuates the grass clippings by providing a discharge outlet of some type in chamber 4. For example, the mower of this invention could have a selectively closable discharge opening (not shown) in quadrants Q3 or Q4 that when opened would allow grass discharge from chamber 4 to either a bagging or collecting receptacle or to be deposited on top of the grass. However, such an opening would be selectively closed in any manner known in the art to allow use of the mower as a mulcher. In this mulching mode, the grass transport would continue from quadrants Q3 and Q4 back around and around in chamber 4 in the circumferential path C until the grass clippings are cut finely enough that they may be driven downwardly into the cut grass path through the open bottom side of cutting chamber 4.

Referring now to the cross-hatched areas shown in FIG. 1, it can be seen that chamber 4 is not perfectly round, but is obround to the rear thereof. The shading in the first two quadrants Q1 and Q2 illustrates a normal nominal clearance with respect to blade tip 9 that is selected with regard to blade diameter and speed of rotation of the blade among other factors. For blades having diameters approximately 25 inches long, the nominal clearance maintained in the first two quadrants is approximately one quarter inch. This nominal clearance is held constant over the first two quadrants Q1 and Q2 as seen by the even width of the shading over these areas in FIG. 1. In other words, cutting chamber 4 is circularly shaped relative to blade tip 9 over the front half thereof.

However, chamber 4 has a different shape over the rear half of chamber 4. The shading depicting the clearance begins to gradually increase from the ends of the front half (denoted by the letters E in FIG. 1) until the clearance reaches a maximum at the midpoint of the rear half (denoted by the letter M in FIG. 1). It's as if an additional crescent shaped clearance is gradually added to the nominal clearance over the rear half to slowly increase or stretch the shape of cutting chamber 4 over the rear half. This provides an "obround" shape for the cutting chamber as that term is defined in the Background of the Invention Section of this application with the obround portion of chamber 4 being to the rear of chamber 4 taken with regard to the direction of forward motion of the mower. The mower normally moves forwardly in the direction illustrated by the arrows A.

The additional clearance being added in the obround portion of chamber 4 at its maximum desirably includes an additional three-eighths of an inch. Thus, at the midpoint of the front half of chamber 4, the clearance is simply the nominal value of one-quarter of an inch. At the midpoint M of the rear half of chamber 4, the clearance is the nominal clearance plus the additional clearance for a total of clearance of five-eighths of an inch. Since the normal manufacturing tolerance for this type of product would be approximately plus or minus one-eighth of an inch, the actual maximum clearance at the midpoint M of the rear half of chamber 4 would fall within the range of about one-half to three-quarters of an inch. Thus, expressed in percentage terms, the obround portion has a maximum clearance of from 200–300% of the nominal clearance, and preferably a maximum clearance of 250% of the nominal clearance.

The Applicants have found that placing the obround portion to the rear of cutting chamber 4 provides significant advantages in a mulching mower. Initially, the Applicants tried placing the obround portion to the front of chamber 4 in the manner suggested by certain prior art mowers of Toro with which the Applicants were familiar. This mower exhibited the undesirable characteristic of dumping the halos of grass being carried in cutting chambers 4 upon a reversal of direction of the mower. In other words, as the mower is moving forwardly in the direction A and blades 6 are cutting grass, the grass clippings are being circulated inside chambers 4 in the circumferential paths C with some clippings collectively forming a toroidal "halo" therein. Even though some clippings are always being driven downwardly to be hidden in the cut grass path, other newly cut clippings are continuously being added to the halo during operation of the mower. If the operator approaches a tree or other obstruction, requiring a reversal of direction, it was found that these halos of clippings would often be deposited on top of the grass when the operator backed up. This is obviously undesirable in a mulching mower in which the clippings are supposed to be nicely hidden in the cut grass path.

Upon further study, the Applicants discovered that a vertical airflow is induced in cutting chamber 4 that is superimposed on the circumferential flow C. When the obround portion is at the front, it was found that air is sucked up at the back of chamber 4 and is blown downwardly at the front of chamber 4, possibly because chamber 4 and blade sail 8 form a less efficient fan at the obround portion than at the circular portion of chamber 4, though this theory of operation is not certain. In any event, the Applicants believe that the downwardly directed airflow discovered by the Applicants at the obround front portion of the chamber was responsible for the dumping of the halos when mower 2 reversed direction. In addition, the downward flow would also tend to flatten the grass at the front of chamber 2, doing exactly the opposite of what placing the obround portion at the front was thought to do, i.e. to elevate the grass properly prior to cutting by blade 6.

Upon discovering this phenomenon, the Applicants then arrived at the present invention by reversing the placement of the obround portion, i.e. by putting the obround portion at the rear of chamber 4 and not the front. Now, the induced vertical airflow is upward at the front of chamber 4, tending to elevate the grass before it is cut as is desirable, and downward at the rear of chamber 4 to cause the cut grass clippings to be properly and quickly deposited in the cut grass path. See the airflow arrows U ("up") and D ("down") in FIG. 2. This arrangement more effectively evacuates cutting chamber 4 and causes the grass clippings to be driven downwardly into the grass without large halos of grass building up in chambers 4. It was found that such a structure would allow mower 2 to back up and reverse direction without dumping any halos of grass from chambers 4.

The mower of the present invention effectively solves the problem discovered by Applicants in using a mulching mower with an obround to the front cutting chamber. Cutting deck 2 as designed herein effectively deposits grass clippings down into the cut grass path and hides them therein. In addition, no halos of grass are dumped in an unsightly fashion when the cutting deck motion is reversed by the operator of mower 2. Moreover, since an upward airflow U is induced over the front half of the cutting chamber, this helps elevate the grass prior to cutting and improves the quality of cut. Finally, because cutting deck 2 has its chambers 4 more effectively evacuated and the grass clippings are more quickly and efficiently hidden in the grass, the power requirements for driving blades 6 are significantly reduced. Applicants have found that chambers 4 with the obround portion to the rear use significantly less power, and tend to bog down less when cutting grass, than obround to the front chambers.

The amounts of the nominal blade clearance and the additional blade clearance described herein can obviously be varied. The amounts noted above were found to work well with blades having a 25" diameter and being rotated at 2500 r.p.m. Making the amount of the clearance in the obround portion much larger than the range set forth herein gradually caused the mower to become a less effective mulcher, i.e. the grass would be too quickly evacuated from the chamber, or would fall out of the chamber, and not be properly hidden in the cut grass path. If the obround portion is much smaller, it is believed that the upward and downward airflows U and D begin disappearing, the grass halos carried in the chambers correspondingly become larger, the power requirements for driving the blades go up, and the quality of cut of the mower decreases.

As shown herein, grass deflecting members are desirably located inside cutting chambers 4 to assist in the downward movement of clippings from chamber 4 to allow mower 2 to function as a more effective mulcher. These deflecting members are generally illustrated as 20 herein. Two such deflecting members 20 are used in each chamber with the deflecting members being located only over the rear half, i.e. the obround portion, of chamber 2. The deflecting members 20 include attachment flanges 22 which allow the deflecting members 20 to be bolted or otherwise secured to the top wall portion 10 of chamber 4 and to depend downwardly therefrom. The deflecting members are located above the plane of rotation of blade 6 in a position to intercept the grass clipping flow in chamber 4.

Each deflecting member 20 includes triangular front and rear faces 24 and 26, respectively, which are angled downwardly relative to the top wall portion and are angled slightly inwardly relative to the peripheral wall 14. Grass clippings circulating in the path C will impact against front face 24 of deflecting member 20 to be deflected downwardly. This assists in causing the grass clippings to be evacuated out of chamber 4 through the open bottom thereof and to be forcefully driven or hidden in the cut grass path. Preferably, the front face 24 is more steeply angled, i.e. more perpendicular relative to the top wall portion, than the rear face 26. It is believed by Applicants that a more vertical front face, i.e. a more steeply angled front face, better deflects the grass clippings downwardly in the desired manner.

Deflecting members 20 are positioned by design only in the rear half of cutting chamber 4 keeping in mind Applicants' discovery of the induced vertical airflows created by an obround cutting chamber. As noted earlier, the obround to the rear cutting chamber 4 of this invention is arranged to induce an upward airflow U in the front half of cutting chamber 4. Thus, spacing the deflecting members 20 around the entire circumference of cutting chamber 4 would inevitably place some of these members 20 in the front half. Applicants believe that the downward deflection of grass clippings caused by such members 20 would tend to interfere with and lessen the desirable upward airflow U in the front half (quadrants Q1 and Q2) and might prevent the grass from being elevated as fully as would otherwise happen. Thus, the deflecting members 20 are desirably located only in the rear half (quadrants Q3 and Q4) where the downward deflecting action of the deflecting members would be additive to or assist the downwardly induced airflow D in driving the grass clippings down out of chamber 4 to more quickly evacuate the chamber.

The use of the obround cutting chambers disclosed herein is not tied to or dependent on the use of any, or of any particular placement of, grass deflecting members 20. For example, a chamber 4 having no deflecting members 4 would still function as a mulcher, and the use of the obround to the rear cutting chamber will enhance use as a mulcher, separate and apart from the deflecting action provided by members 20. However, the use of the members 20 is preferred as it allows mower 2 to perform better as a mulcher in terms of more effectively depositing the grass particles in the cut grass path.

Originally, the Applicants designed a cutting chamber in which the cutting blade 6 was wholly contained within the peripheral wall 14, i.e. the plane of the cutting blade was above the lowermost edge 15 of wall 14 around the entire circumference of wall 14 except of course for the area of aperture 18. However, with this orientation, if some object on the ground were to stick up and strike the front of cutting deck 4, such as an upwardly protruding tree root or the like, the first thing that would contact this object would often be the front of wall 14 as the wall 14 was the lowermost point extending down below even the nose 3 of cutting deck 4. In extreme cases and with an unyielding object, this could cause the wall 14 to be deflected back into contact with blade tip 9. This contact would damage both wall 14 and the blade 6, requiring repairs to be made to the mower.

Figure 2:
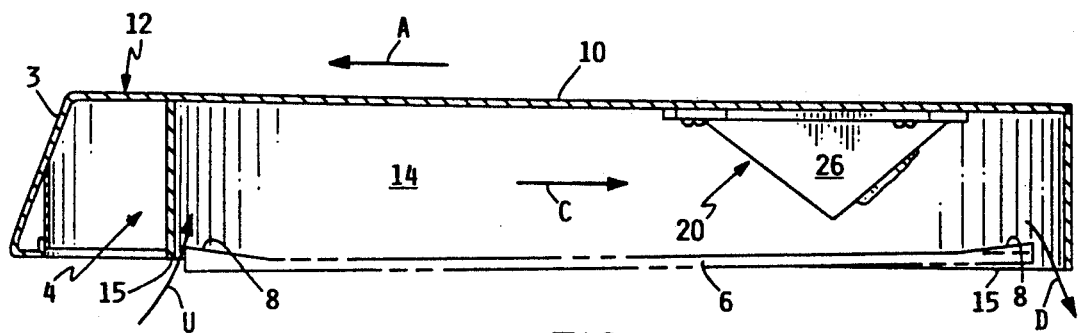
FIG. 2 is a cross-sectional view of a cutting chamber along lines 2—2 in FIG. 1, particularly illustrating the vertical height of the lower edge of the cutting chamber relative to the plane of rotation of the cutting blade.

To avoid this damage, the lowermost edge 15 of wall does not have a constant height or depth relative to the plane of rotation of blade 6. As shown in FIG. 2, the lowermost edge 15 of wall is positioned slightly above the plane of blade 6 over the front portion of chamber 4, and then tapers downwardly in height therefrom to be located beneath the plane of blade 6 over the rear half of chamber 4. Thus, blade 6 is now the lowermost point of deck 2 at the front of chamber 4, extending beneath both the nose 3 of deck 4 as well as the lowermost edge 15 of chamber 4 at that point. Thus, if a protruding tree root is now struck, blade 6 might scalp or cut the root, but wall 14 will not be deflected back into the blade, thus avoiding the damage that previously occurred.

Various modifications of this invention will be apparent to those skilled in the art. For example, the mower could be provided as noted earlier with grass bagging or discharge capabilities that might be selectively used by the operator at certain times, but unused when the mower is desirably in a mulching mode. In other words, the cutting chambers might have various discharge outlets that would be open when bagging or discharging the grass, but closed when the mower is mulching to provide the generally enclosed cutting chambers disclosed herein. Thus, any description herein of "generally enclosed" cutting chambers or the like would refer to cutting chambers which are selectively enclosed in only the grass mulching mode of a convertible type mower as well as to cutting chambers which are always substantially enclosed in a single use type dedicated mulcher.

In addition, while the "obround" chambers have been depicted herein as being formed by stretching the chamber shape with respect to a blade that is otherwise centered in the chamber, the Applicants believe that much the same grass "mulching" effect could probably be achieved by using a circular chamber and simply placing the blade axis in an offset location forward of the center of the chamber. This latter condition is also believed to be an "obround" chamber as that term is defined herein and would be included in the meaning of "obround". Thus, the scope of the present invention is to be limited only by the appended claims.

We claim:

1. A mower of the type having at least one generally enclosed cutting chamber in which a generally horizontal cutting blade is contained, the cutting blade being rotatable about a vertical axis to sever grass or the like, wherein the cutting chamber includes a peripheral side wall which substantially surrounds the blade and is relatively unbroken at the level of the grass clippings being circulated by rotation of the blade such that the grass clippings are contained within the cutting chamber until such time as they are driven downwardly out of the cutting chamber through an open bottom side of the cutting chamber, and wherein the improvement relates to the shape of the cutting chamber and comprises:

a cutting chamber which is obround over the rear portion thereof.

2. A mower as recited in claim 1, wherein the cutting blade has a tip at each end thereof with the blade tips having a nominal clearance to the inside of the peripheral wall of a pre-determined amount, and wherein the obround portion of the cutting chamber has a maximum clearance relative to the tip of the cutting blade which is in the range of 200-300% of the nominal clearance.

3. A mower as recited in claim 2, wherein the cutting chamber includes four quadrants comprising a front left quadrant, a front right quadrant, a rear right quadrant and a rear left quadrant when viewed from beneath, wherein the front left and right quadrants maintain the nominal clearance to the blade tips, and wherein the obround portion begins at the start of the rear right quadrant and ends at the end of the rear left quadrant with the amount of the clearance gradually increasing from the beginning of the obround portion to the intersection between the rear right and left quadrants with the amount of the clearance then gradually decreasing from the intersection point to the end of the obround portion.

4. A mower as recited in claim 1, wherein the cutting chamber includes a top wall portion which prevents the grass clippings from being discharged upwardly out of the cutting chamber, and further including at least one deflector member located inside the peripheral wall of the cutting chamber and secured to an underside of the top wall, the deflector members having a grass deflecting surface arranged above the plane of rotation of the blade to intercept the flow of grass clippings in the cutting chamber.

5. A mower as recited in claim 4, wherein two deflector members are located in the obround rear portion of the cutting chamber.

6. A mower as recited in claim 1, wherein a plurality of such cutting chambers are provided arranged side-by-side across the width of a cutting deck, and wherein each such cutting chamber includes a portion which is obround to the rear thereof.

7. A mower which comprises a cutting chamber formed by a top wall and a downwardly depending peripheral side wall which extends downwardly from the top wall, the side wall being generally unbroken around 360° of travel to form an enclosed cutting chamber for grass clippings that are severed by a horizontal cutting blade contained inside the side wall which blade is shaped for circulating the grass clippings in a circumferential path inside the cutting chamber, wherein the side wall has at least a nominal clearance relative to a tip of the blade over a front portion of the side wall taken with respect to the direction of forward travel of the mower and an increased clearance relative to the blade tip over a rear portion of the side wall such that the chamber defined by the side wall is not perfectly circular relative to the blade tip but is stretched or elongated over the rear portion thereof relative to the blade tip.

8. A mower as recited in claim 7, wherein the increased clearance comprises a crescent shaped amount of additional clearance which is added to the nominal clearance over at least a segment of the rear portion of the side wall such that the additional clearance tapers progressively to a maximum located at a mid-point of the rear portion of the side wall.

9. A mower as recited in claim 8, wherein the nominal clearance is one quarter of an inch, and wherein the additional clearance is approximately three eighths of an inch plus or minus one-eighth of an inch for a total clearance at the mid-point of the rear portion of the side wall of one-half to three-quarters of an inch.

10. A mower as recited in claim 9, wherein the side wall has a lowermost edge over the forward portion of the side wall which is above the plane of rotation of the blade, and wherein the lowermost edge of the side wall then drops vertically relative to the plane of rotation of the blade to extend down beneath the plane of rotation of the blade over the rear portion of the side wall.

11. A mower of the type having a generally horizontal cutting deck which is movable over the ground, wherein the cutting deck includes at least one generally enclosed cutting chamber which projects downwardly from a too wall of the cutting deck with the cutting chamber being substantially open only at the bottom thereof, a rotatable cutting blade contained inside the cutting chamber and having blade tips which have at least a nominal clearance with a peripheral side wall defining a circumferential boundary of the cutting chamber, wherein the cutting chamber includes a front half and a rear half taken with reference to the direction of forward movement of the cutting deck such that the front half contacts uncut grass before the rear half as the cutting deck is being moved forwardly over the ground, wherein the side wall in the front half maintains the nominal clearance relative to the blade tips such that the cutting deck is circular with respect to the axis of rotation of the blade in the front half of the cutting deck, and wherein the side wall in the rear half of the cutting deck gradually increases its clearance from the nominal clearance to a maximum clearance located at the midpoint of the side wall in the rear half to cause the side wall in the rear wall of the half to have an obround shape relative to the axis of rotation of the blade.

12. A mower as recited in claim 11, further including grass deflecting means located in the cutting chamber above a plane of rotation of the blade and above radially outer portions of the blade, wherein the grass deflecting means is located only in the rear half of the cutting chamber.

13. A mower as recited in claim 12, wherein the grass deflecting means comprises two circumferentially spaced deflector members located proximate to the peripheral side wall of the cutting chamber.

14. A mower as recited in claim 13, wherein the deflector members each include a relatively steeply angled deflector face against which grass clippings traveling in the cutting chamber impact to be driven downwardly through the open bottom of the cutting chamber.

15. A mower of the type having a generally horizontal cutting deck which is movable over the ground, wherein the cutting deck includes at least one generally enclosed cutting chamber which projects downwardly from a top wall of the cutting deck with the cutting chamber being substantially open only at the bottom thereof, a rotatable cutting blade contained inside the cutting chamber and having blade tips which have at least a nominal clearance with a peripheral side wall defining a circumferential boundary of the cutting chamber, wherein the cutting chamber includes a front half and a rear half taken with reference to the direction of forward movement of the cutting deck such that the front half contacts uncut grass before the rear half as the cutting deck is being moved forwardly over the ground, and further including grass deflecting means located in the cutting chamber above a plane of rotation of the blade and above radially outer portions of the blade, wherein the grass deflecting means is located only in the rear half of the cutting chamber.

16. A mower as recited in claim 15, wherein the grass deflecting means comprises two circumferentially spaced deflector members located proximate to the peripheral side wall of the cutting chamber.

17. A mower as recited in claim 16, wherein the deflector members each include a relatively steeply angled deflector face against which grass clippings traveling in the cutting chamber impact to be driven downwardly through the open bottom of the cutting chamber.

18. A mower as recited in claim 16, wherein the deflector members are symmetrically positioned in the rear half of the cutting chamber on either side of a longitudinal centerline of the cutting chamber.

19. A mower as recited in claim 15, wherein the grass deflecting means comprises a plurality of circumferentially spaced deflector members which deflector members are symmetrically positioned in the rear half of the cutting chamber on either side of a longitudinal centerline of the cutting chamber.

* * * * *

UNITED STATES PATENT AND TRADEMARK OFFICE
CERTIFICATE OF CORRECTION

PATENT NO. : 5,212,938

DATED : May 25, 1993

INVENTOR(S) : Michael N. Zenner et al.

It is certified that error appears in the above-indentified patent and that said Letters Patent is hereby corrected as shown below:

In claim 11, "too" should read --top-- at Column 9, line 63.

In claim 11, delete "wall of the" at Column 10, line 14.

Signed and Sealed this

Fifteenth Day of April, 1997

Attest:

BRUCE LEHMAN

*Attesting Officer*  *Commissioner of Patents and Trademarks*